US008768386B2

(12) United States Patent
Chen et al.

(10) Patent No.: US 8,768,386 B2
(45) Date of Patent: Jul. 1, 2014

(54) METHOD, APPARATUS AND SYSTEM FOR PROCESSING SHORT MESSAGE

(71) Applicant: Huawei Technologies Co., Ltd., Shenzhen (CN)

(72) Inventors: Haiyong Chen, Shanghai (CN); Lin Shu, Shanghai (CN); Caixia Qi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/670,908

(22) Filed: Nov. 7, 2012

(65) Prior Publication Data
US 2013/0065619 A1 Mar. 14, 2013

Related U.S. Application Data

(63) Continuation of application No. PCT/CN2010/072567, filed on May 10, 2010.

(51) Int. Cl.
*H04Q 7/20* (2006.01)
*H04W 4/12* (2009.01)
*H04W 4/14* (2009.01)

(52) U.S. Cl.
CPC .. *H04W 4/12* (2013.01); *H04W 4/14* (2013.01)
USPC ........... 455/458; 455/466; 455/445; 455/439; 455/436; 455/435.1; 370/352; 370/328; 370/229; 370/353

(58) Field of Classification Search
USPC ................................. 455/466, 458
See application file for complete search history.

(56) References Cited

U.S. PATENT DOCUMENTS

| 6,678,524 | B1 | 1/2004 | Hansson et al. |
| 2003/0039237 | A1 | 2/2003 | Forslow |
| 2008/0287104 | A1 | 11/2008 | Sundberg et al. |
| 2011/0021216 | A1 * | 1/2011 | Pudney et al. ................. 455/466 |
| 2011/0191430 | A1 * | 8/2011 | Griot et al. .................... 709/206 |

FOREIGN PATENT DOCUMENTS

| CN | 101132552 | 2/2008 |
| CN | 101448217 | 6/2009 |
| CN | 101494848 | 7/2009 |
| EP | 1947868 A1 | 7/2008 |

(Continued)

OTHER PUBLICATIONS

International Search Report of Corresponding PCT Application PCT/CN2010/072567 mailed Feb. 24, 2011.

(Continued)

*Primary Examiner* — Charles Appiah
*Assistant Examiner* — Randy Peaches
(74) *Attorney, Agent, or Firm* — Staas & Halsey LLP (57) ABSTRACT

Embodiments of the present invention disclose a method and apparatus for processing a short message, and a system, and relate to the field of communications technologies, which enable a terminal to receive a short message in time on the premise of not interrupting a current PS service, enhance user experience, reduce resource consumption of a short message service, and optimizes a utilization rate of a network resource. A method for processing a short message provided in an embodiment of the present invention includes: determining, by a network element in 2G or 3G, that a current service type is short message; receiving, by the network element, a short message sent by an MME; and delivering, by the network element, the short message to a terminal through an established PS connection.

8 Claims, 7 Drawing Sheets

(56) References Cited

FOREIGN PATENT DOCUMENTS

| JP | 2001-517910 | 10/2001 |
| JP | 2003-535526 | 11/2003 |
| WO | 2009/089704 | 7/2009 |

OTHER PUBLICATIONS

PCT Written Opinion of the International Search Report mailed Feb. 24, 2011, issued in corresponding PCT Patent Application No. PCT/CN2010/072567.
Chinese Office Action mailed May 10, 2013 in corresponding Chinese Application No. 201080001614.1.
Extended European Search Report issued Jun. 4, 2013 in corresponding European Application No. 10851205.4.
3GPP TSG SA2 Meeting #10, "SMS Support in 3G-SGSN", S2-99E55, Abiko, Japan, Nov. 29-Dec. 3, 1999, pp. 1-6.
3GPP TSG-SA WG2 Meeting #66, "SMS Support for ISR-Activated UE", S2-084683, Montreal, Canada, Jun. 23-27, 2008, pp. 1-3.
3GPP TSG-SA WG2 Meeting #67, "SMS Services Support for ISR-Activated UE", S2-85801, Sophia Antipolis, France, Aug. 25-29, 2008, pp. 1-4.
3GPP TSG-SA WG2 Meeting #76, "Co-Existence of ISR and SMS Over SGs", TD S2-096968, San Jose Del Cabo, Mexico, Nov. 16-20, 2009, pp. 1-4.
3GPP TS 23.272, $3^{rd}$ Generation Partnership Project; Technical Specification Group Services and System Aspects; Circuit Switched (CS) fallback in Evolved Packet System (EPS); Stage 2 (Release 9), vol. 9.3.0, Mar. 2010, pp. 1-66.
Japanese Office Action mailed Jan. 7, 2014 in corresponding Japanese Patent Application No. 2013-509421.

\* cited by examiner

METHOD, APPARATUS AND SYSTEM FOR PROCESSING SHORT MESSAGE

CROSS-REFERENCE TO RELATED APPLICATIONS

This application is a continuation of International Application No. PCT/CN2010/072567, filed on May 10, 2010, which is hereby incorporated by reference in its entirety.

TECHNICAL FIELD

The present invention relates to the field of communications technologies, and in particular embodiments, to method, apparatus and system for processing a short message.

BACKGROUND

The 3rd Generation Partnership Project (3rd Generation Partnership Project, 3GPP) launches an evolved packet system (Evolved Packet System, EPS) on the basis of the existing 2G and 3G networks. During early construction of an EPS network, an operator already has a mature circuit switched (Circuit Switch, CS) network and the EPS network only processes a data service. In view of protection of CS investment and a deployment strategy of the EPS network, the operator may use an original CS domain device to provide a CS service. Based on such a need, the 3GPP brings out a CS fallback (Fallback) technology, that is, when the CS service needs to be processed, a terminal covered by an evolved UMTS territorial radio access network (Evolved UMTS Territorial Radio Access Network, E-UTRAN) is handed over to the CS network to complete service processing. In this way, an objective that the existing CS domain device is reused to provide a conventional CS service for a user in the EPS network is achieved.

A short message service is an important constituent part of CS services at present. The operator hopes to continue to provide the existing short message service in the EPS network and implement mobile originating (Mobile Originating, MO) and mobile terminating (Mobile Terminating, MT) short message services. Moreover, because a terminal is frequently handed over between different access networks in areas where the E-UTRAN overlaps or is neighboring to a GSM/EDGE radio access network (GSM/EDGE Radio Access Network, GERAN) or a UMTS terrestrial radio access network (UMTS Terrestrial Radio Access Network, UTRAN), which results in large quantities of invalid location update signaling, and increases a signaling load of an air interface. The 3GPP introduces an idle state signaling reduction (Idle State Signaling Reduction, ISR) mechanism, which reduces the location update signaling, which is caused by frequent network handover, in a manner of double registration of the terminal with different access networks within a certain range.

When ISR is active, a mobility management entity (Mobility Management Entity, MME) initiates a paging (Paging) message, where the paging message carries a packet switched (Packet Switch, PS) domain indication, to the terminal through the E-UTRAN after receiving a paging message from a mobile-services switching centre (Mobile-services Switching Centre, MSC). Meanwhile, the MME sends a paging indication message to an associated serving general packet radio service (General Packet Radio Service, GPRS) support node (Serving GPRS Support Node, SGSN). The SGSN sends a paging message carrying a CS domain indication to the terminal through the GERAN or UTRAN. The terminal executes a corresponding service according to the domain indication in the paging message.

However, many problems exist in the prior art. For example, in a scenario of the mobile terminated short message service, if the terminal is performing a PS service when receiving the paging message of the SGSN, the terminal suspends the ongoing PS service after receiving the paging message that carries the CS domain indication, and returns to a CS domain to receive a short message, thereby resulting in an interruption of the current PS service of the user.

SUMMARY OF THE INVENTION

To resolve the problems that exist in the prior art, embodiments of the present invention provide method, apparatus and system for processing a short message.

In order to achieve the foregoing objective, the embodiments of the present invention adopt the following technical solutions.

A method for processing a short message includes:
determining, by a network element in 2G or 3G, that a current service type is short message;
receiving, by the network element, a short message sent by a mobility management entity MME; and
delivering, by the network element, the short message to a terminal through an established packet switched PS connection.

An apparatus for processing a short message includes:
a service type determining unit, configured to determine that a current service type is short message;
a receiving unit, configured to receive a short message sent by a mobility management entity MME; and
a delivering unit, configured to deliver the short message to a terminal through an established packet switched PS connection.

A communication system includes a terminal, a mobility management entity MME, and a serving general packet radio service GPRS support node SGSN, where:
the SGSN is configured to determine that a current service type is short message, receive a short message sent by the MME, and deliver the short message to the terminal through an established packet switched PS connection.

According to the technical solutions provided in the embodiments of the present invention, after determining that the current service type is short message service, the network element in 2G or 3G delivers the received short message to the terminal through the PS connection, which enables the terminal to receive the short message in time on the premise of not interrupting a current PS service and enhances user experience.

A method for processing a short message includes:
determining, by a network element in 2G or 3G; that a current service type is short message;
selecting, by the network element, a short message delivery method according to a connection state of a terminal, a working mode of the terminal, and a network capability; and
delivering the short message to the terminal according to the delivery method.

An apparatus for processing a short message includes:
a service type determining unit, configured to determine that a current service type is short message;
a delivery method selecting unit, configured to select a short message delivery method according to a connection state of a terminal, a working mode of the terminal, and a network capability; and
a delivering unit, configured to deliver the short message to the terminal according to the delivery method.

According to the technical solutions in the embodiments of the present invention, the short message processing manner is selected according to the connection state and working mode of the terminal, enabling the terminal to receive the short message on the premise of not interrupting the current PS service, which enhances the user experience, reduces resource consumption of a short message service, and optimizes a utilization rate of a network resource.

BRIEF DESCRIPTION OF THE DRAWINGS

To illustrate the technical solutions according to the embodiments of the present invention or in the prior art more clearly, accompanying drawings needed for describing the embodiments or the prior art are introduced below briefly. Obviously, the accompanying drawings in the following descriptions are merely some embodiments of the present invention, and persons of ordinary skill in the art may obtain other accompanying drawings according to these accompanying drawings without making creative efforts.

DETAILED DESCRIPTION OF THE EMBODIMENTS

The technical solutions in the embodiments of the present invention are clearly and completely described in the following with reference to the accompanying drawings in the embodiments of the present invention. Obviously, the described embodiments are only part of rather than all of the embodiments of the present invention. All other embodiments obtained by persons of ordinary skill in the art based on the embodiments of the present invention without making creative efforts shall fall within the protection scope of the present invention.

Figure 1:
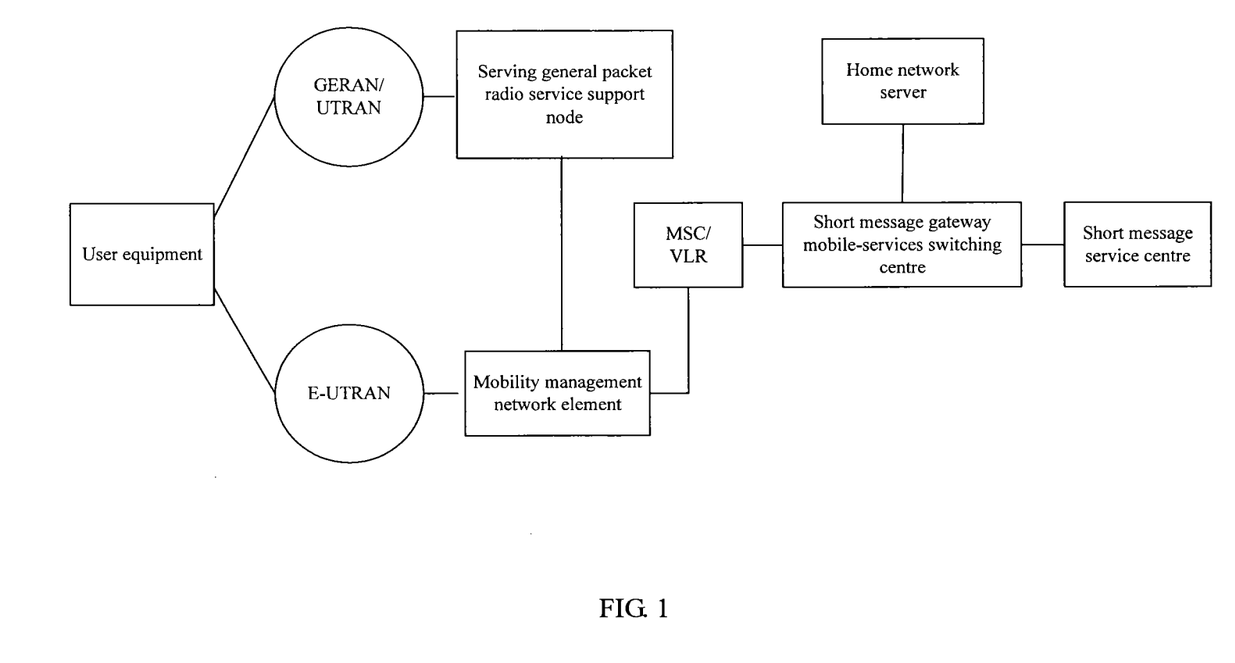
FIG. 1 is a schematic diagram of an application scenario according to an embodiment of the present invention.

FIG. 1 shows a schematic diagram of an application scenario of implementing a short message service according to an embodiment of the present invention, including: a short message service centre (Short Message Service Centre, SM-SC), configured to transmit or receive a short message; a short message service gateway mobile-services switching centre (Short Message Service Gateway MSC, SMS-GMSC), responsible for forwarding of the short message and obtaining of routing information; a home subscriber server (Home Subscriber Server, HSS), configured to store user subscription data and short message routing information; a mobile-services switching centre (Mobile-services Switching Centre, MSC), responsible for switching of CS services with a user equipment (User Equipment, user equipment) and management of an SGs interface connection with an MME; the mobility management entity (Mobility Management Entity, MME), responsible for mobility management of an EPS network control plane, including management of user context and a mobility state, and allocation of temporary user identities, and so on; an SGSN, configured to implement functions such as route forwarding, mobility management, session management, and subscriber information storage in a GPRS/UMTS network; a GSM/EDGE radio access network (GSM/EDGE Radio Access Network, GERAN) and a UMTS terrestrial radio access network (UMTS Terrestrial Radio Access Network, UTRAN), configured to implement all radio related functions in the existing GPRS/UMTS network; and an evolved UMTS terrestrial radio access network (Evolved UMTS Terrestrial Radio Access Network, E-UTRAN), configured to implement all radio related functions of an EPS network.

Figure 2:
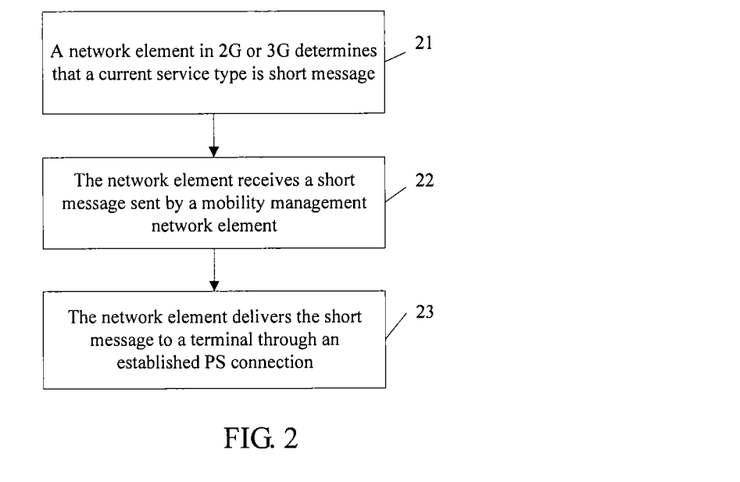
FIG. 2 is a schematic diagram of a method for processing a short message according to a first embodiment of the present invention.

Referring to FIG. 2, a method for processing a short message provided in a first embodiment of the present invention includes:

Step 21: A network element in 2G or 3G determines that a current service type is short message;

Step 22: The network element receives a short message sent by a mobility management entity; and Step 23: The network element delivers the short message to a terminal through an established packet switched PS connection.

Idle state signaling reduction (Idle State Signaling Reduction, ISR) is activated between the foregoing network element in 2G or 3G and the mobility management element, so that the network element receives the short message sent by the mobility management entity. The network element in 2G or 3G may be a serving general packet radio service support node (Serving GPRS Supporting Node, SGSN) or another network element that has the corresponding functions. The foregoing terminal may be a user equipment (User Equipment, UE).

In the technical solution provided in the embodiment of the present invention, after determining that the current service type is short message service, the network element in 2G or 3G delivers the received short message to the terminal through the PS connection, which enables the terminal to receive the short message on the premise of not interrupting a current PS service and enhances user experience.

Figure 3:
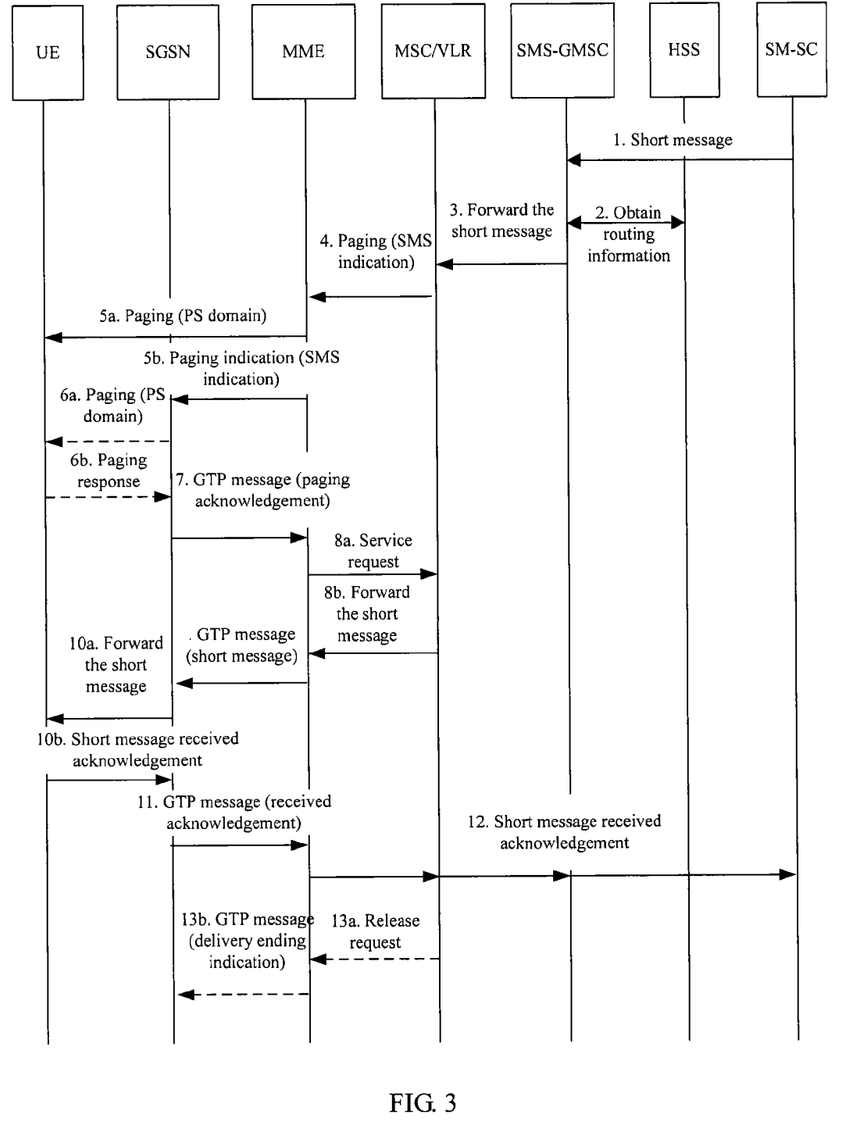
FIG. 3 is a flowchart of processing a short message according to a second embodiment of the present invention.

A method for processing a short message provided in a second embodiment of the present invention is described in detail in the following. Referring to FIG. 3, the following processing is specifically included:

301. A short message service centre (SM-SC) determines to initiate a user equipment terminated short message service and sends one or more short messages to an SMS-GMSC.

302. After receiving the short message sent by the SM-SC, the SMS-GMSC obtains short message routing information (such as a MSC number) from an HSS.

303. The SMS-GMSC forwards the short message to an MSCNLR.

304. The MSCNLR detects an SGs interface connection with an MME and sends, to the MME, a paging request message (SGsAP-PAGING-REQUEST), where the paging request message indicates that a current paged service type is short message.

305a. The MME sends a paging message to a user equipment, where the message carries a PS domain indication. Because ISR is active, in this case, the following is also included:

305b. The MME sends a paging indication message to an associated SGSN, where the paging indication message indicates that the current paged service type is short message. For example, the paging indication message carries a service indication, where the service indication indicates that the current service type is short message. Therefore, the SGSN may acquire that the currently paged service is short message.

306. After receiving the paging indication message of the MME, the SGSN determines that the current service type is short message. In this case, if the user equipment is in a connected state, step 307 is directly executed; otherwise, if the user equipment is in an idle state, steps 306a and 306b are first executed.

306a. The SGSN sends the paging message to the user equipment, where the paging message carries the PS domain indication to trigger to establishment of a PS connection.

306b. The user equipment sends a paging response message to the SGSN so that the SGSN knows that the establishment of a PS connection is completed.

307. The SGSN sends an acknowledgement message to the MME.

The SGSN notifies the MME through the foregoing acknowledgement message that the user equipment currently camps on a 2G or 3G network (such as a GERAN or UTRAN network) and the PS connection is already established. The acknowledge message may be implemented by a GPRS tunneling protocol (GPRS Tunneling Protocol, GTP) message

308. After receiving the acknowledgement message from the SGSN, the MME performs the following operations:

308a. The MME sends a service request (SGsAP-SERVICE-REQUEST) message to the MSCNLR, requesting the MSCNLR to start delivery of the short message.

308b. The MSCNLR stops the current paging after receiving the service request and sends a downlink unit data (SGsAP-DOWNLINK-UNITDATA) message to the MME, so as to deliver the short message to the MME.

309. The MME delivers the short message to the SGSN. For example, the MME delivers the short message to the SGSN through a GTP message.

310a. The SGSN delivers the short message to the user equipment through the currently established PS connection.

310b. After receiving the short message, the user equipment sends a short message received acknowledgement message to the SGSN.

311. The SGSN forwards the short message received acknowledgement message to the MME through a GTP message.

312. The MME sends an uplink unit data (SGsAP-UPLINK-UNITDATA) message to the MSCNLR, so as to deliver the short message received acknowledgement message to the MSCNLR; and then the MSCNLR forwards the short message received acknowledgement message to the SM-SC via the SMS-GMSC.

313. Optionally, after short message transmission ends, the MSCNLR sends a release request message (such as an SGsAP-RELEASE-REQUEST message) to the MME; the MME sends indication information to the SGSN according to the release request. For example, the MME sends an indication message to the SGSN through a GTP message, where the indication message notifies the SGSN that the transmission of the short message is completed. After receiving the indication information, the SGSN releases the PS connection that has been established for the delivery of the short message.

When the user equipment needs to receive multiple short messages at once, the foregoing step 308b to step 312 are repeated to implement reception of all of the short messages.

In the technical solution provided in the embodiment of the present invention, after determining that the current service type is short message service, the network element in the 2G or 3G network delivers the received short message to the terminal through the PS connection, which enables the terminal to receive the short message on the premise of not interrupting the current PS service and enhances user experience.

The technical solution of the embodiment of the present invention provides a uniform short message processing architecture without a need to differentiate specific features of a terminal, such as a working mode and a connection state and so on, which simplifies an operation and has wide application prospect.

Figure 4:
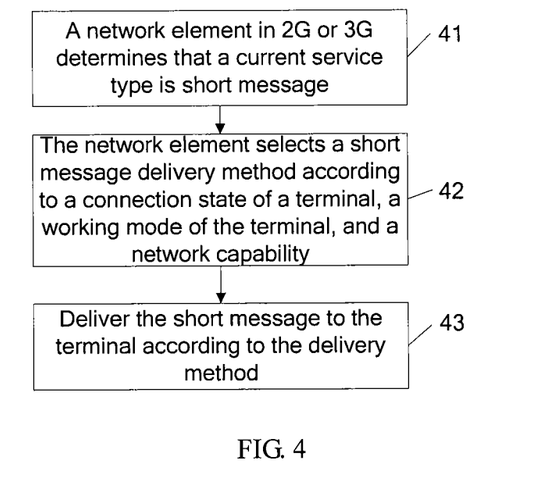
FIG. 4 is a schematic diagram of a method for processing a short message according to a third embodiment of the present invention.

Referring to FIG. 4, a method for processing a short message provided in a third embodiment of the present invention specifically includes the following processing:

Step 41: A network element in a 2G or 3G network determines that a current service type is short message.

Step 42: The network element selects a short message delivery method according to a connection state of a terminal, a working mode of the terminal, and a network capability.

Step 43: Deliver the short message to the terminal according to the delivery method.

The connection state of the foregoing terminal includes an idle state and a connected state. The working mode of the terminal mainly includes the terminal working in an Iu mode, the terminal working in an A/Gb mode and supporting a dual transfer mode (Dual Transfer Mode, DTM), and the terminal working in the A/Gb mode but not supporting DTM. The network capability includes a network supporting DTM and the network not supporting DTM, or the network capable of executing a PS service and a CS service simultaneously and the network incapable of executing the PS service and the CS service simultaneously.

The technical solution in the embodiment of the present invention selects a short message processing manner according to the connection state and working mode of the terminal, which enables the terminal to receive short messages on the premise of not interrupting the current PS service, enhances the user experience, reduces resource consumption of a short message service, and optimizes a utilization rate of a network resource.

Figure 5:
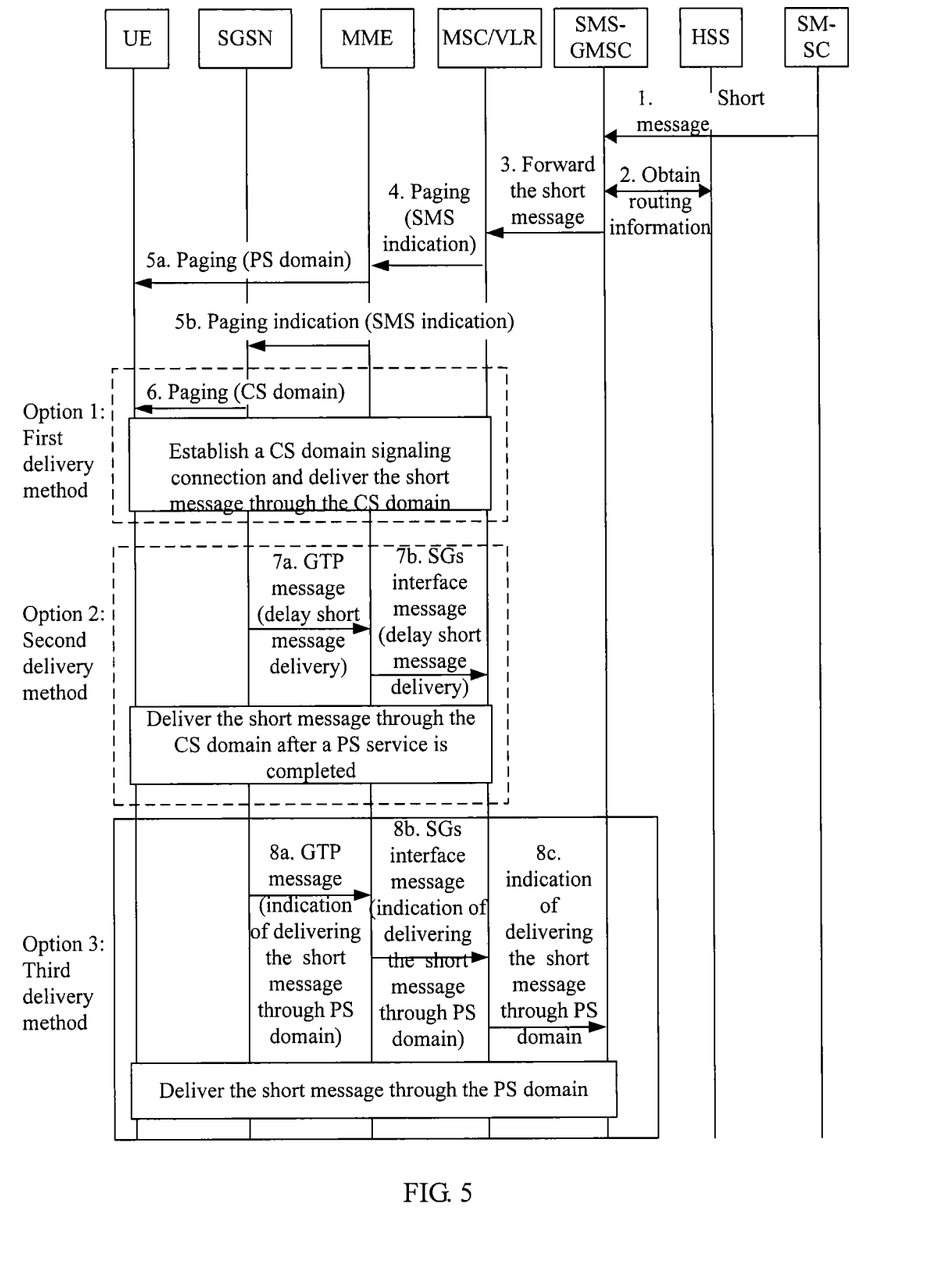
FIG. 5 is a flowchart of processing a short message according to a fourth embodiment of the present invention.

Referring to FIG. 5, a method for processing a short message provided in a fourth embodiment of the present invention specifically includes the following processing:

Reference may be made to step 301 to step 305b in FIG. 3 for step 501 to step 505b in FIG. 5.

After determining that a current service type is short message according to a paging indication message sent by an MME, an SGSN selects a short message delivery method according to a connection state of a terminal (such as a user equipment), a working mode of the terminal, and a network capability. At least four situations as follows are included:

In a first situation, the user equipment is in an idle state.

In this case, there may be no need to check the working mode of the user equipment and the network capability, and a first delivery method is directly selected to use a CS domain to complete delivery of a short message. In the first delivery method, the SGSN sends a paging message to the user equipment, where the paging message carries CS domain indication information. The user equipment sends a paging response message to an MSCNLR directly through a CS connection. The MSCNLR delivers the short message to the user equipment through the CS connection.

In this case, a third delivery method may also be selected to use a PS domain to complete the delivery of the short message. In the third delivery method, the SGSN sends a message to the MME, notifying the MME of delivering the short message through the PS domain; the MME forwards the message to the MSCNLR through an SGs interface, notifying the MSCNLR of delivering the short message through the PS domain; the MSCNLR sends the message to an SMS-GMSC, so that the SMS-GMSC delivers the short message to the terminal through the PS domain.

In a second situation, the user equipment is in a connected state, the working mode of the user equipment is an Iu mode, or the working mode of the user equipment is an A/Gb mode and DTM is supported, and a network side supports DTM.

When the user equipment is in the Iu mode, the user equipment may execute a PS service and a CS service simultaneously. In this case, the network side is also required to be capable of executing the PS service and the CS service simultaneously. When the user equipment is in the A/Gb mode and supports DTM, the network side is also required to support DTM.

In this situation, a first delivery method is selected to use the CS domain to complete the delivery of the short message. When executing the PS service, the user equipment may establish a CS connection to execute the CS service simultaneously. Referring to step 506 in FIG. 5, the SGSN sends a paging message to the user equipment, where the paging message carries CS domain indication information. The user equipment directly sends a paging response message to the MSCNLR. The MSCNLR delivers the short message to the user equipment through the CS domain.

In this case, a third delivery method may also be selected to use the PS domain to complete the delivery of the short message. In the third delivery method, the SGSN sends a message to the MME, notifying the MME of delivering the short message through the PS domain; the MME forwards the message to the MSCNLR through the SGs interface, notifying the MSCNLR of delivering the short message through the PS domain; the MSCNLR sends the message to the SMS-GMSC, so that the SMS-GMSC delivers the short message to the terminal through the PS domain.

For easy description of the technical solution in the embodiment of the present invention, words such as "first" and "second" are used in the embodiment of the present invention to differentiate the same or similar items, the functions and effects of which are basically the same. Those skilled in the art may understand that "first" and "second" do not limit an amount and an execution sequence.

In a third situation, the user equipment is in the connected state and the working mode of the user equipment is the A/Gb mode but DTM is not supported.

In this situation, the user equipment cannot execute the PS service and the CS service simultaneously. In order not to interrupt the current PS service, a second delivery method may be adopted where the delivery of the short message is delayed until the current PS service of the user equipment ends.

Referring to step 507*a* and step 507*b* in FIG. 5, the SGSN sends delay indication information to the MME, where the delay indication information may be implemented by a GTP message. The MME forwards the delay indication information to the MSCNLR through the SGs interface, so as to notify the MSCNLR of delivering the short message to the user equipment through a CS domain connection after the PS service of the user equipment ends.

In this situation, the user equipment cannot execute the PS service and the CS service simultaneously. In order not to interrupt the current PS service and to enable the user equipment to receive the short message in time, a third delivery method may be adopted to deliver the short message to the user equipment through the PS domain.

Referring to steps from 508*a* to 508*c* in FIG. 5, the SGSN sends a message to the MME, notifying the MME of delivering the short message through the PS domain; the MME forwards the message to the MSCNLR through the SGs interface, notifying the MSCNLR of delivering the short message through the PS domain; the MSCNLR sends the message to the SMS-GMSC, so that the SMS-GMSC delivers the short message to the user equipment through the PS domain.

The technical solution in the embodiment of the present invention selects a short message processing manner according to the connection state and working mode of the terminal, which enables the terminal to receive the short message on the premise of not interrupting the current PS service, enhances user experience, reduces resource consumption of a short message service, and optimizes a utilization rate of a network resource.

Moreover, by differentiating specific features of a network and the terminal, the embodiment of the present invention gives multiple short message delivery methods. In a practical application, a corresponding short message delivery method may be selected flexibly according to different needs, which enables full utilization of an existing CS resource, and implements the delivery of the short message while ensuring that the PS service is not affected.

Figure 6:
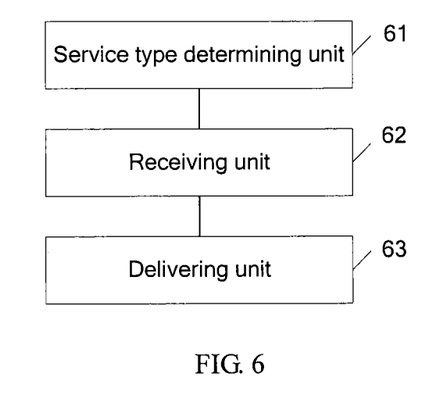
FIG. 6 is a schematic structural diagram of an apparatus for processing a short message according to a fifth embodiment of the present invention.

Accordingly, a fifth embodiment of the present invention provides an apparatus for processing a short message. Referring to FIG. 6, the apparatus includes:

a service type determining unit 61, configured to determine that a current service type is short message;

a receiving unit 62, configured to receive a short message sent by a mobility management entity MME; and a delivering unit 63, configured to deliver the short message to a terminal through an established packet switched PS connection.

Further, the receiving unit 62 is configured to receive a paging indication message, where the paging indication message carries service indication information and the service indication indicates that the current service type is short message; the service type determining unit 61 is specifically configured to determine, according to the paging indication message received by the receiving unit 62, that the current service type is short message.

Figure 7:
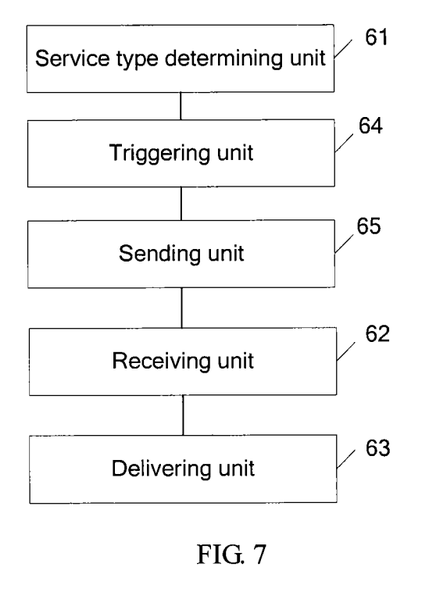
FIG. 7 is another schematic structural diagram of an apparatus for processing a short message according to the fifth embodiment of the present invention.

Further, referring to FIG. 7, the apparatus further includes a triggering unit 64, configured to, with respect to the terminal in an idle state, send a paging message to the terminal after receiving the paging indication message, where the paging message sent to the terminal carries PS domain indication information, so as to trigger the establishment of a PS connection.

The receiving unit 62 is further configured to receive a paging response message sent by the terminal, so as to acquire that the establishment of the PS connection is completed.

Further, the apparatus includes a sending unit 65.

The sending unit 65 is configured to send an acknowledgement message to the MME, notifying the MME that the terminal camps on a 2G or 3G network and has established the PS connection, so that the MME obtains the short message according to the acknowledgement message and sends the short message to the receiving unit 62.

Reference may be made to the method embodiments of the present invention for specific working manners of the functional modules and units in the apparatus embodiment of the present invention. The functional modules and units in the apparatus embodiment of the present invention may be implemented separately, and may also be implemented by being integrated in one or more units.

The embodiment of the present invention further provides a communication system, including the foregoing apparatus for processing the short message. Reference may be made to the method embodiments of the present invention for a specific working manner of the apparatus for processing the short message.

In the technical solution provided in the embodiment of the present invention, after determining that a current service type is short message service, the network element in the 2G or 3G network delivers the received short message to the terminal through the PS connection, which enables the terminal to receive the short message on the premise of not interrupting a current PS service and enhances user experience.

Figure 8:
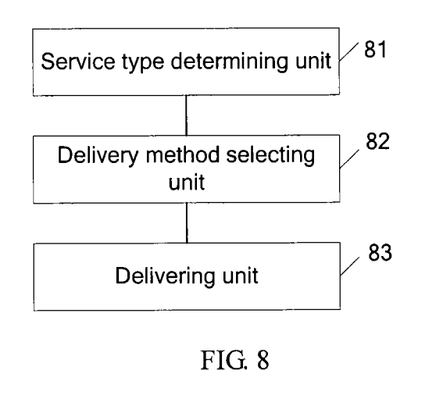
FIG. 8 is a schematic structural diagram of an apparatus for processing a short message according to a sixth embodiment of the present invention.

In addition, a sixth embodiment of the present invention may further provide an apparatus for processing a short message. Referring to FIG. 8, the apparatus includes:

a service type determining unit 81, configured to determine that a current service type is short message;

a delivery method selecting unit 82, configured to select a short message delivery method according to a connection state of a terminal, a working mode of the terminal, and a network capability; and a delivering unit 83, configured to deliver the short message to the terminal according to the delivery method.

Further, the delivery method selecting unit 82 is specifically configured to select a first delivery method or a third delivery method when the terminal is in an idle state; select a first delivery method or a third delivery method when the terminal is in a connected state, and the working mode of the terminal is an Iu mode, or the working mode of the terminal is an A/Gb mode and a dual transfer mode DTM is supported; and select a second delivery method or a third delivery method when the terminal is in the connected state and the working mode of the terminal is the A/Gb mode but DTM is not supported.

Reference may be made to the method embodiments of the present invention for specific working manners of the functional modules and units in the apparatus embodiment of the present invention. The functional modules and units in the apparatus embodiment of the present invention may be implemented separately, and may also be implemented by being integrated in one or more units.

The embodiment of the present invention further provides a communication system, including the foregoing apparatus for processing the short message. Reference may be made to the method embodiments of the present invention for a specific working manner of the apparatus for processing the short message.

The technical solution in the embodiment of the present invention selects a short message processing manner according to the connection state and working mode of the terminal, which enables the terminal to receive the short message on the premise of not interrupting a current PS service, enhances user experience, reduces resource consumption of a short message service, and optimizes a utilization rate of a network resource.

Figure 9:
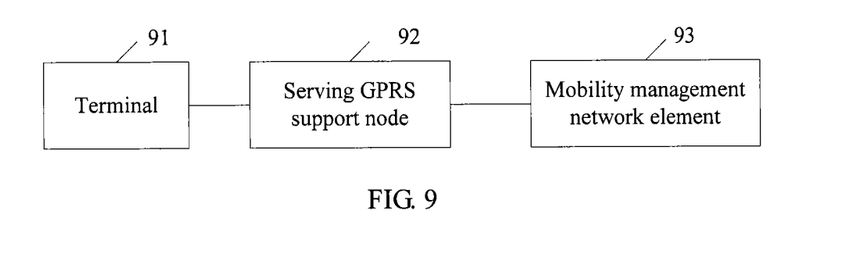
FIG. 9 is a simplified schematic structural diagram of a communication system according to a seventh embodiment of the present invention.

A seventh embodiment of the present invention provides a communication system. Referring to FIG. 9, the system includes a terminal 91, an MME 93, and an SGSN 92. The foregoing SGSN 92 is configured to determine that a current service type is short message and receive a short message sent by the MME 93; and configured to deliver the short message to the terminal 91 through an established packet switched PS connection.

Reference may be made to the methods for processing the short message provided in the first and second embodiments of the present invention for specific working methods of the devices in the system provided in the embodiment of the present invention. In the technical solution provided in the embodiment of the present invention, after determining that the current service type is short message service, the SGSN in a 2G or 3G network delivers the received short message to the terminal through the PS connection, which enables the terminal to receive the short message on the premise of not interrupting a current PS service and enhances user experience.

Persons skilled in the art may clearly understand that the present invention may be implemented through software plus a necessary universal hardware platform. Based on such understanding, the technical solutions of the present invention or the part that makes contribution to the prior art may be embodied in the form of a software product. The computer software product may be stored in a storage medium, such as, a ROM/RAM, a magnetic disk, a compact disk, and so on, which contains several instructions configured to enable a computer device (may be a personal computer, a server, or a network equipment) to execute each embodiment of the present invention or the method described in some parts of the embodiments.

The foregoing descriptions are only specific embodiments of the present invention, but the protection scope of the present invention is not limited here. Any modification or replacement that may be easily thought of by those skilled in the art within the technical scope disclosed in the present invention shall fall within the protection scope of the present invention. Therefore, the protection scope of the present invention is subject to the claims.

What is claimed is:

1. A method for processing a short message, comprising:
determining, by a network element in a 2G or 3G network, that a current service type is short message;
selecting a delivery method to send a short message to a terminal to enable the terminal to receive the short message without requiring interruption of a packet switched (PS) service based on if the terminal is in an idle state, or the terminal is in a connected state and a working mode of the terminal is an Iu mode, or the terminal is in the connected state and the working mode of the terminal is an A/Gb mode and a dual transfer mode (DTM) is supported by the terminal;
according to the selected delivery method, sending, by the network element, a paging message carrying circuit switched (CS) domain indication information to the terminal, wherein the CS domain indication information instructs the terminal to send a paging response message to a mobile-services switching centre/visitor location register (MSC/VLR) through a CS connection and receive the short message from the MSC/VLR through the CS connection.

2. The method according to claim 1, wherein, the determining, by the network element in the 2G or 3G network, that the current service type is short message comprises:
determining, by the network element, that the current service type is short message according to a received paging indication message, wherein the paging indication message carries service indication information and the service indication information indicates that the current service type is short message.

3. An apparatus for processing a short message, comprising a processor and a transmitter, wherein:
the processor is configured to determine that a current service type is short message, and select a delivery method to send a short message to a terminal to enable the terminal to receive the short message without requiring interruption of a packet switched (PS) service based on if the terminal is in an idle state, or the terminal is in a connected state and a working mode of the terminal is an Iu mode, or the terminal is in the connected state and the working mode of the terminal is an A/Gb mode and a dual transfer mode (DTM) is supported by the terminal;

the transmitter is configured to, according to the selected delivery method, send a paging message carrying circuit switched (CS) domain indication information to the terminal, wherein the CS domain indication information instructs the terminal to send a paging response message to a mobile-services switching centre/visitor location register (MSC/VLR) through a CS connection and to receive the short message from the MSC/VLR through the CS connection.

4. The apparatus according to claim 3, further comprising:

a receiver, configured to receive a paging indication message, wherein the paging indication message carries service indication information and the service indication information indicates that the current service type is short message, wherein the processor configured to determine that the current service type is short message is configured to determine that the current service type is short message according to the paging indication message.

5. A method for processing a short message, comprising:

receiving, by a network element in a 2G or 3G network, a paging indication message, wherein the paging indication message carries service indication information and the service indication information indicates that a current service type is short message;

determining, by the network element, that the current service type is short message according to the paging indication message;

selecting, by the network element, a delivery method to send a short message to a terminal to enable the terminal to receive the short message without requiring interruption of a packet switched (PS) service based on if the terminal is in an idle state;

according to the selected delivery method, sending, by the network element, a paging message to the terminal in the idle state, wherein the paging message carries PS domain indication information to trigger the terminal to establish a PS connection, receiving, by the network element, a paging response message sent by the terminal to acquire that the PS connection is established, receiving, by the network element, the short message sent by a mobility management entity (MME), and delivering, by the network element, the short message to the terminal through the PS connection.

6. The method according to claim 5, wherein after the receiving, by the network element, the paging response message sent by the terminal to acquire that the PS connection is established, the method further comprises:

sending, by the network element, an acknowledgement message to the MME to notify the MME that the terminal camps on the 2G or 3G network and has established the PS connection.

7. An apparatus for processing a short message, comprising a receiver, a transmitter and a processor, wherein:

the receiver is configured to receive a paging indication message, wherein the paging indication message carries service indication information and the service indication information indicates that a current service type is short message;

the processor is configured to determine that the current service type is short message according to the paging indication message received by the receiver, and select a delivery method to send a short message to the terminal to enable the terminal to receive the short message without requiring interruption of a packet switched (PS) service based on if the terminal is in an idle state;

the transmitter is configured to send, according to the selected delivery method, a paging message to the terminal in the idle state, wherein the paging message carries PS domain indication information to trigger the terminal to establish a PS connection;

the receiver is further configured to receive, according to the selected delivery method, a paging response message sent by the terminal to acquire that the PS connection is established;

the receiver is further configured to receive, according to the selected delivery method, the short message sent by a mobility management entity (MME); and the transmitter is further configured to deliver, according to the selected delivery method, the short message to the terminal through the PS connection.

8. The apparatus according to claim 7, wherein:

the transmitter is further configured to send, according to the selected delivery method, an acknowledgement message to the MME to notify the MME that the terminal camps on a 2G or 3G network and has established the PS connection.

* * * * *